US005853595A

United States Patent [19]

Hancock et al.

[11] Patent Number: 5,853,595

[45] Date of Patent: *Dec. 29, 1998

[54] PROCESS FOR INCREASING THE SYSTEM THERMAL CAPABILITY OF A SPLASH FILLED COOLING TOWER

[75] Inventors: R. Douglas Hancock, Dothan, Ala.; Andrew A. Romano, Sparta, N.J.; Russell T. Noble, Birmingham, Ala.

[73] Assignee: Ashland, Inc., Columbus, Ohio

[ * ] Notice: The term of this patent shall not extend beyond the expiration date of Pat. No. 5,565,019.

[21] Appl. No.: 623,555

[22] Filed: Mar. 28, 1996

[51] Int. Cl.$^6$ .................... C02F 5/10

[52] U.S. Cl. .................... 210/698; 95/154; 210/742; 261/DIG. 11; 261/DIG. 46

[58] Field of Search .................... 95/154; 210/698–701, 210/742, 149, DIG. 11, DIG. 46

[56] References Cited

U.S. PATENT DOCUMENTS

| | | | |
|---|---|---|---|
| 3,578,589 | 5/1971 | Hwa et al. | 210/701 |
| 3,633,340 | 1/1972 | Illingworth | 55/84 |
| 5,039,319 | 8/1991 | Glass et al. | 55/178 |
| 5,098,450 | 3/1992 | Patzelt et al. | 55/45 |
| 5,202,400 | 4/1993 | Itoh et al. | 526/240 |
| 5,284,590 | 2/1994 | Kohlhofer et al. | 210/701 |
| 5,401,419 | 3/1995 | Kocib | 210/697 |
| 5,565,019 | 10/1996 | Hancock et al. | 95/154 |

OTHER PUBLICATIONS

Ottewill, Introduction, Surfactants, Academic Press, London, pp. 1–8 (1984).

Blake, Wetting, Surfactants, Academic Press, London, pp. 222–226 (1984).

Hensley, Cooling Tower Fundamentals, The Marley Cooling Tower Company, Kansas City, MO, pp–1–116 (1967).

ASME Performance Test Code PTC 23–1986, Atmospheric Water Cooling Equipment (1986).

Hancock, Macromolecular Surfactants, pp. 288–300.

Cooling Tower—pp. 398–403

DREWPLUS® L–471 Foam Control Agent © 1986 Ashland Oil, Inc.

Influence of Generic Chemical Additives on Cooling–System Performance, A. E Dabiri, et al. (1988).

*Primary Examiner*—Peter A. Hruskoci

*Attorney, Agent, or Firm*—Pollock, Vande Sande & Amernick

[57] ABSTRACT

The invention is a process for increasing the system thermal capability of a splash filled cooling tower where cooling water is circulated and splashed against splash bars during the cooling process. The process comprises contacting the circulating water of the cooling tower with a nonionic surfactant composition in an amount effective to increase the system thermal capability of the cooling tower.

20 Claims, 6 Drawing Sheets

PROCESS FOR INCREASING THE SYSTEM THERMAL CAPABILITY OF A SPLASH FILLED COOLING TOWER

FIELD OF THE INVENTION

The invention is a process for increasing the system thermal capability of cooling tower, preferably a splash filled cooling tower where water is circulated and splashed against splash bars during the cooling process. The process comprises contacting the tower circulating water with a nonionic surfactant composition in an amount effective to increase the system thermal capability of the cooling tower.

BACKGROUND OF THE INVENTION

Industrial machinery and processes generate tremendous amounts of heat which must be continuously absorbed by another medium such as water or air if these machines and processes are to continue to operate efficiently. Typically the heat generated by industrial machinery or processes is absorbed by water which passes through a heat exchanger, such as metal coils. The heated water is then discharged while a continuous source of cool water is supplied to the process (once through cooling). In 'closed' cooling systems, the heated water is circulated to a cooling system, typically an atmospheric cooling tower, to reduce the water temperature before recycling the cooled water back to the heat producing process.

Although cooling towers are used in many industrial processes, power generating plants are of particular interest because of the magnitude of the heat produced and effect of cooling water on process efficiency. These plants are typically powered by steam which is generated to turn turbines. Turbines operate by passing expanding steam through a series of nozzles which are designed to convert the energy of expansion directly into rotational motion. The rotational motion causes an electromagnetic generator to generate electricity on a commercial scale. The steam generated to turn the turbine may be generated by the combustion of fossil fuels or nuclear power. The turbine exit steam generated must be cooled and condensed to water which is recycled to generate more steam. The condensation process occurs in a condensing heat exchanger where heat from the steam is transferred to cooler circulating water. The now heated circulating water is pumped to a cooling tower to be cooled and then recycled back to the condensing heat exchanger.

The water to be cooled in the cooling tower is circulated and distributed in direct contact with cooler air which is circulated by mechanical fans or natural convection. Air flow may be across the cascading liquid or counter current.

Typically, the cooling tower consists of an enclosure which contains a hot water distribution system, a set of louvers or baffles (fill) for breaking the water into small films and droplets, and a cooled water collection basin. There are several internal gridwork arrangements, all designed to enhance water splashing and film formation.

There are many types of manufactured cooling towers including mechanically induced and naturally induced draft towers, crossflow and counterflow towers, wet/dry plume abatement towers, and water conservation towers.

It is known to use certain surfactants in cooling towers to achieve certain results. For instance anionic surfactants are used for cleaning and emulsifying, cationics are used as biocides, and nonionics are used as defoamers for biocides. Although surfactants are used for such purposes in cooling towers, the literature suggests that the use of surfactants in cooling towers has adverse effects. For instance, water can easily become contaminated by surfactants. As a result, surfactants generally reduce the liquid and gas side heat transfer coefficient, and can cause deterioration of the performance of cooling towers. Experimental data suggest that a reduction in heat transfer can also occur. See Dabiri, A. E., et al., "Influence of Generic Chemical Additives on Cooling System Performance", Electric Power Research institute Final Report: CS-5903, July (1988).

SUMMARY OF THE INVENTION

The invention is a process for increasing the system thermal capability of a cooling tower comprising:

contacting the circulating water in the cooling tower with a nonionic surfactant composition in an amount effective to increase the system thermal capability of said cooling tower, said nonionic surfactant composition comprising at least one nonionic surfactant having the following characteristics:

(a) a hydrophobic segment; and (b) a hydrophilic segment derived from 2 to 15 moles derived from a polyalkylene oxide ether, such that the average HLB of the nonionic surfactant composition is from 9–12.

An increase in the system thermal capability of the cooling tower indicates that more efficient absorption of heat by the cooling air is taking place. This results in lower temperature water to the process, and a decrease in the effluent water of the cooling tower.

It is desirable to increase the system thermal capability of the cooling tower as much as possible because even decreases in the effluent water temperature of less than 1° C. represent substantial savings for a power plant. For example, a decrease in the cooling tower effluent temperature of 1° C. in a electric power plant, producing 500,000 kilowatts of electricity can result in an energy saving of about 1500 Btu per hour or a production increase of about 1,500 kilowatts. At a cost of 7.5¢ per kilowatt hour, this translates into savings of more than $110.00 per hour. Since one power company may own several power plants and operate them twenty-four hours per day, the costs savings over a year can easily exceed several million dollars per year.

BRIEF DESCRIPTION OF FIG. 1

FIG. 1 is a schematic view of a splash filled cooling tower with the arrows showing the direction of air flow and water flow.

BRIEF DESCRIPTION OF FIG. 2

FIG. 2 is a transverse cross section of splash filled cooling tower.

BRIEF DESCRIPTION OF FIGS. 3–6

FIGS. 3–6 are graphs which show the effect on cooling tower thermal capability when several nonionic surfactants are added to the basin of the cooling tower.

DETAILED DESCRIPTION OF DRAWINGS

Figure 1:
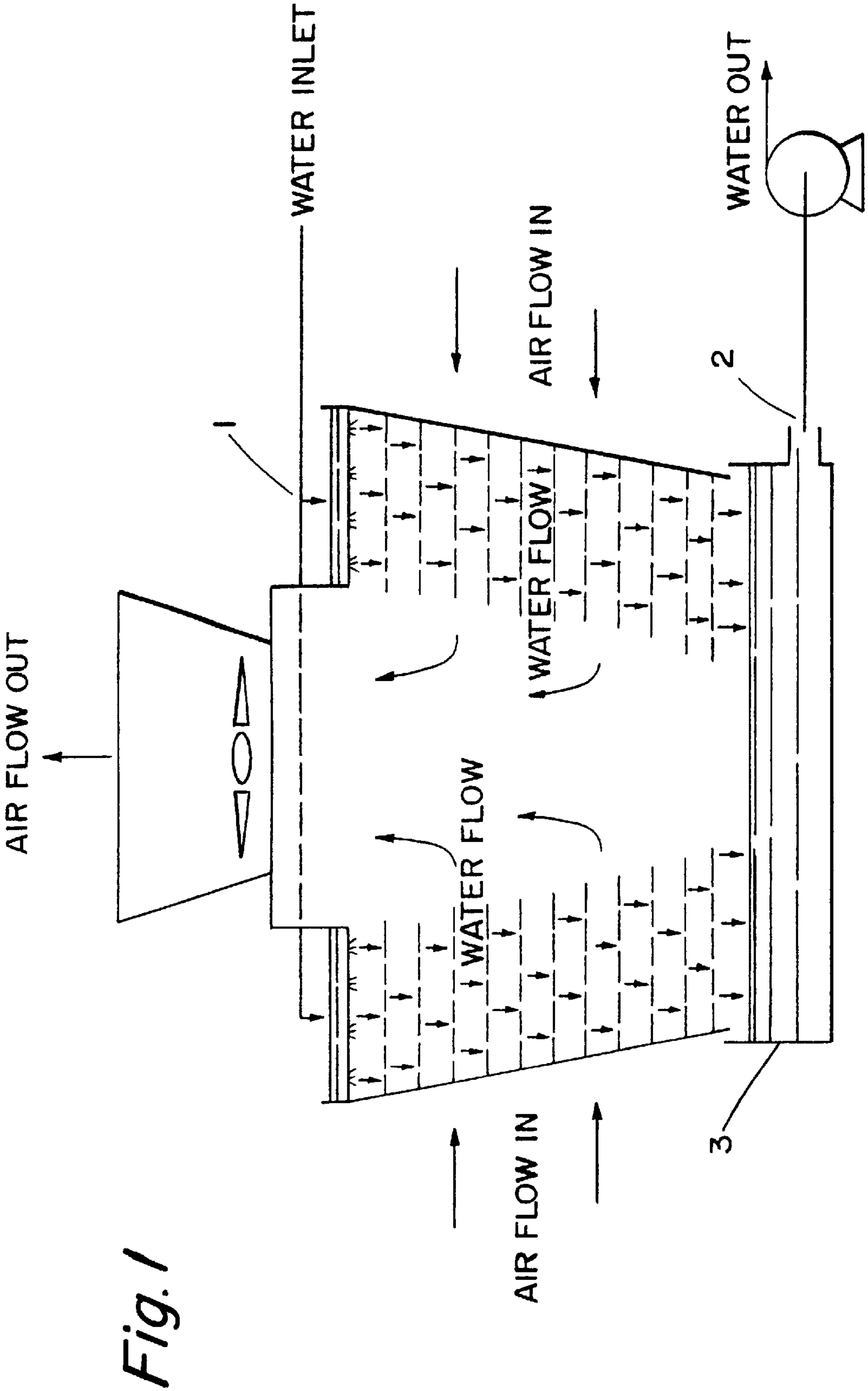

FIG. 1 is a schematic view of a splash filled cooling tower 55'–60' in height with arrows showing water inlet 1, water outlet 2, airflow with directional arrows, water flow with directional arrows, and concrete basin 3 near pump where chemicals were fed into the cooling tower.

Figure 2:
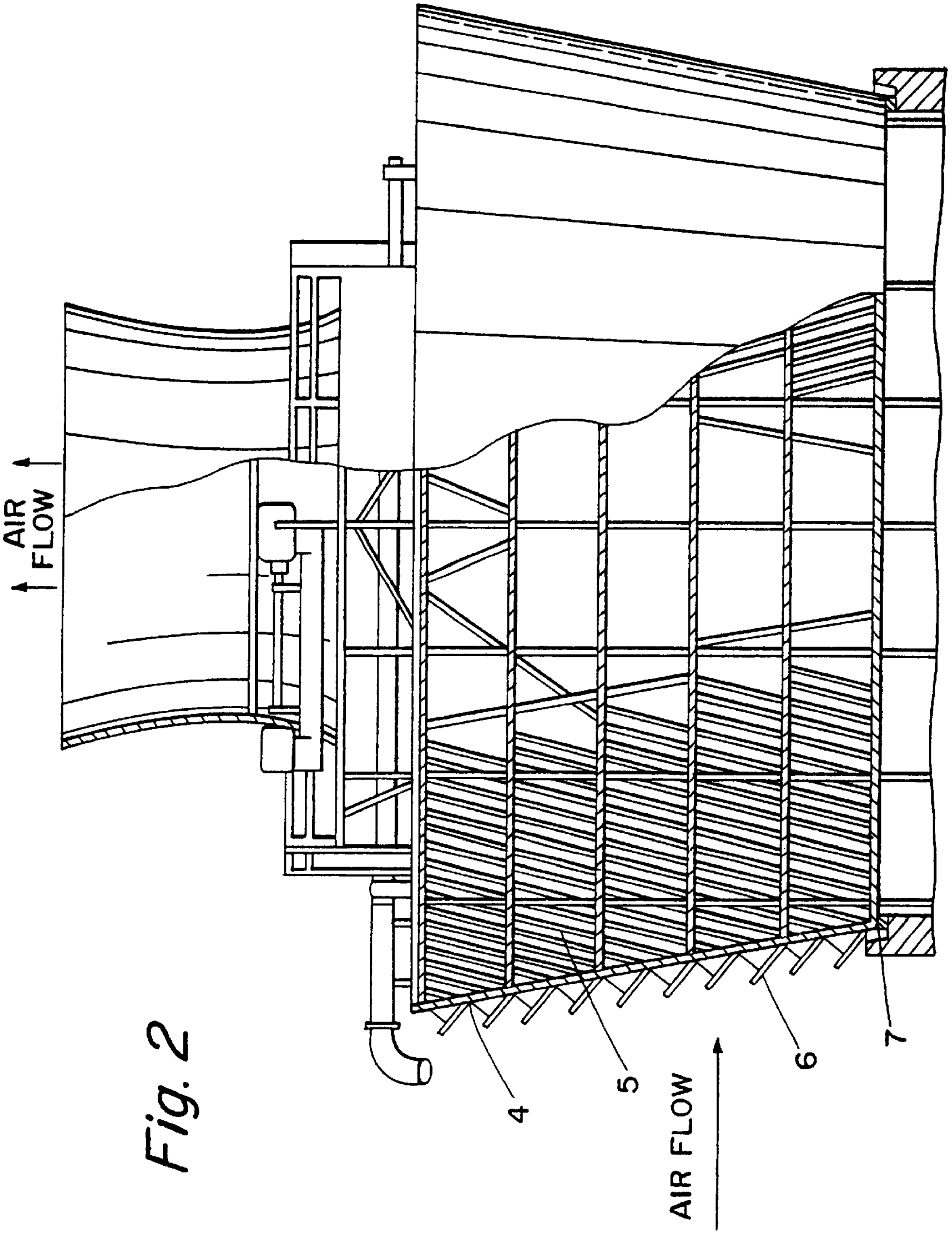
Figure 3:
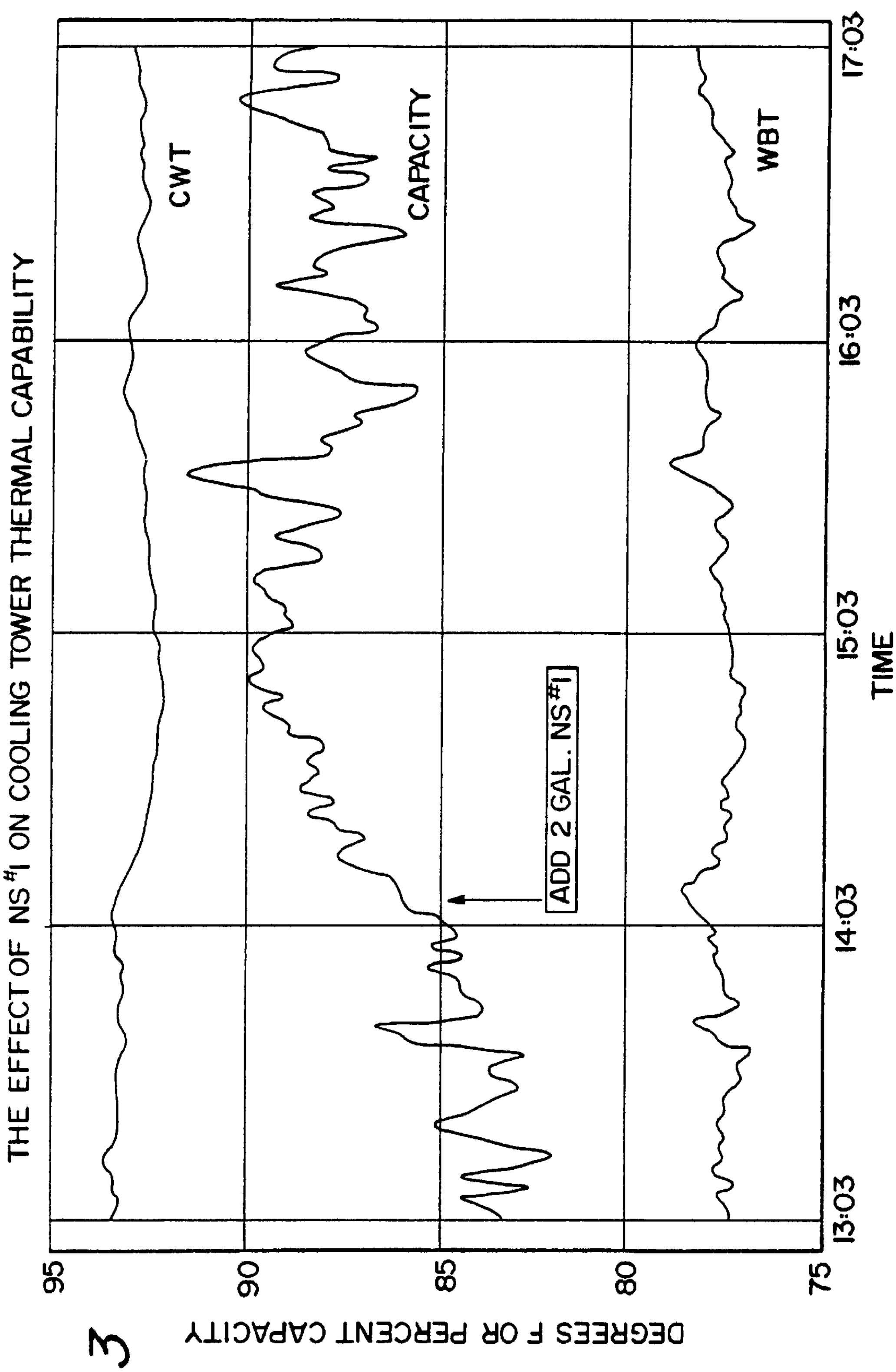
Figure 4:
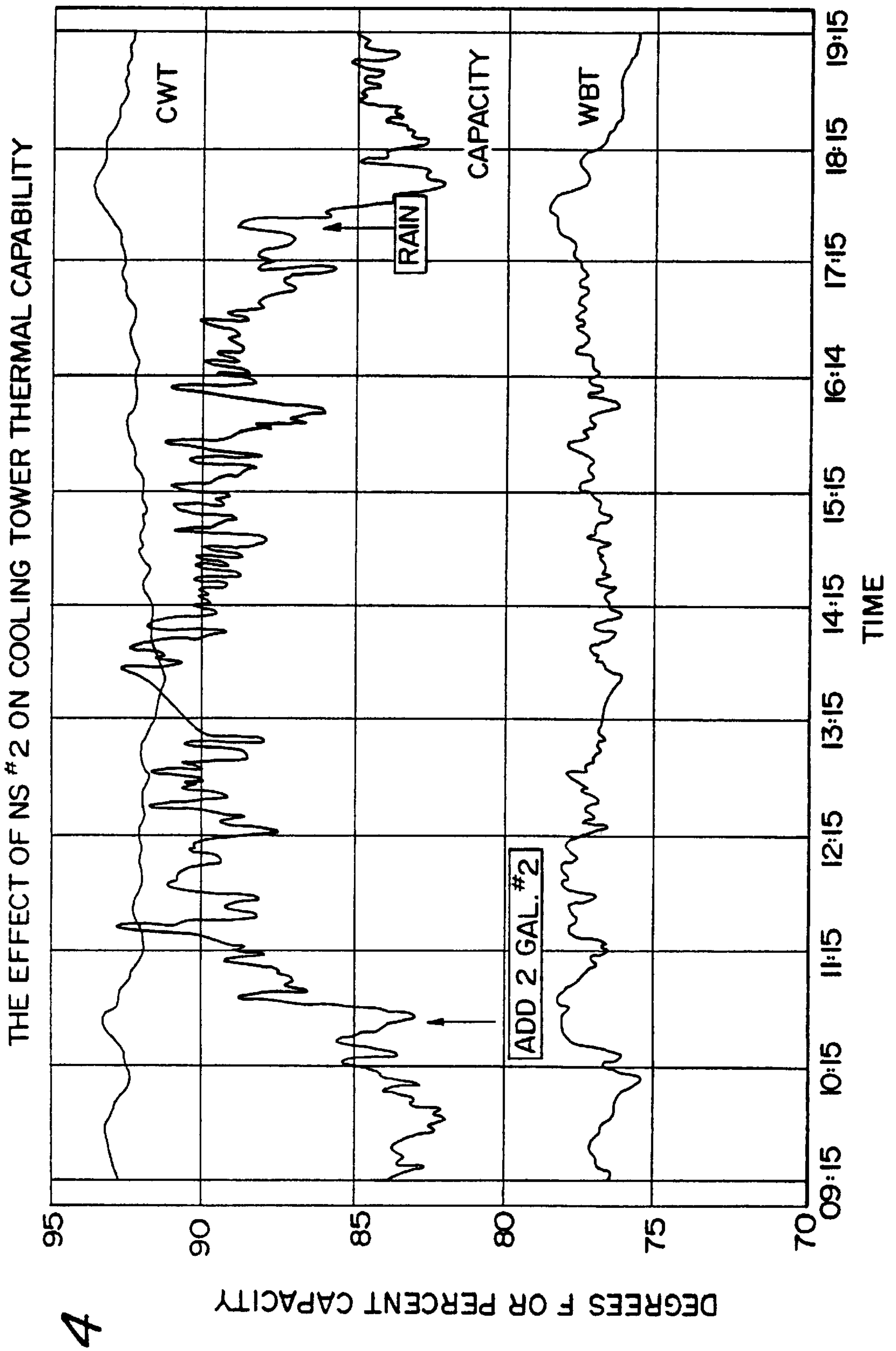
Figure 5:
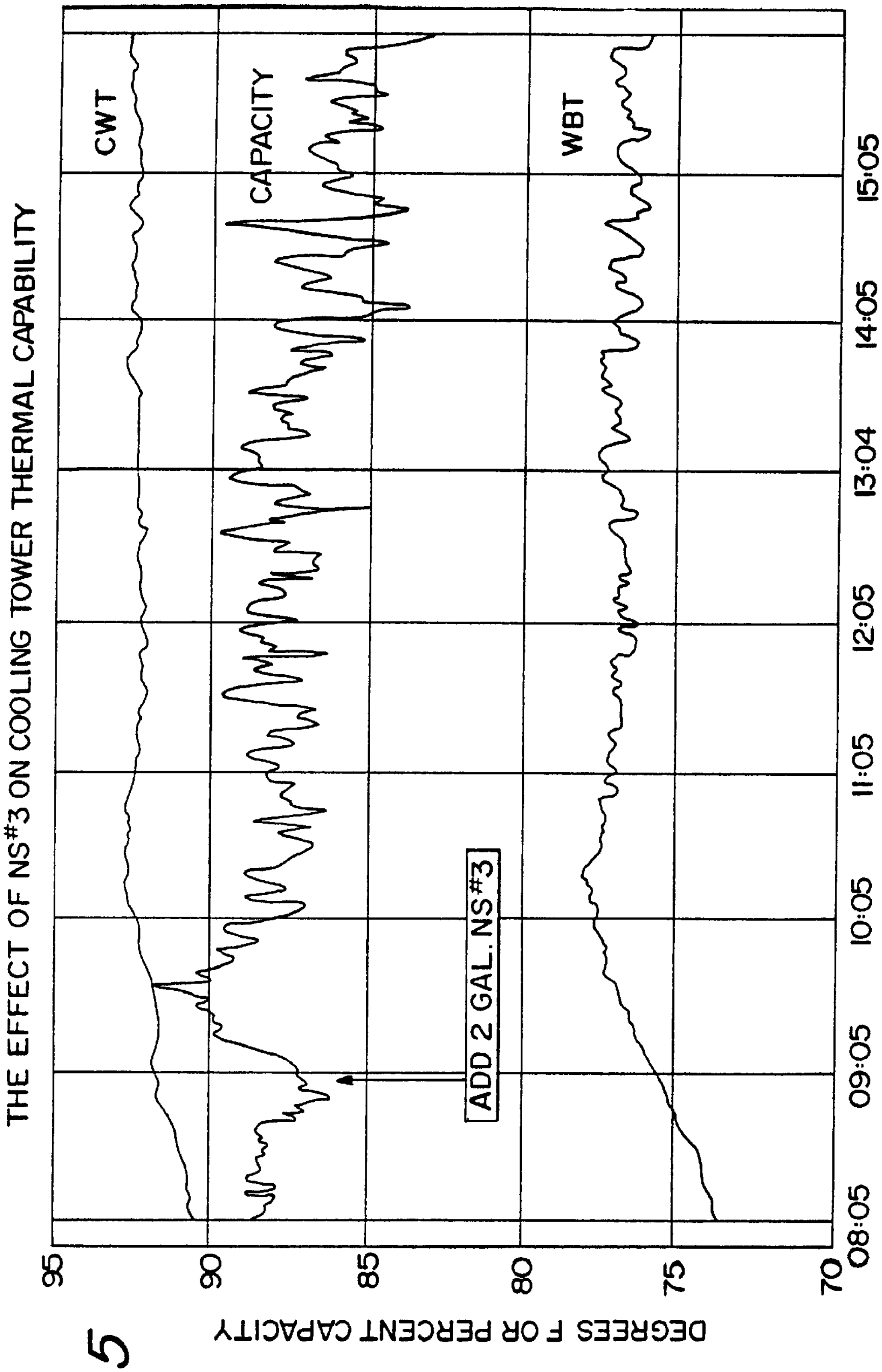
Figure 6:
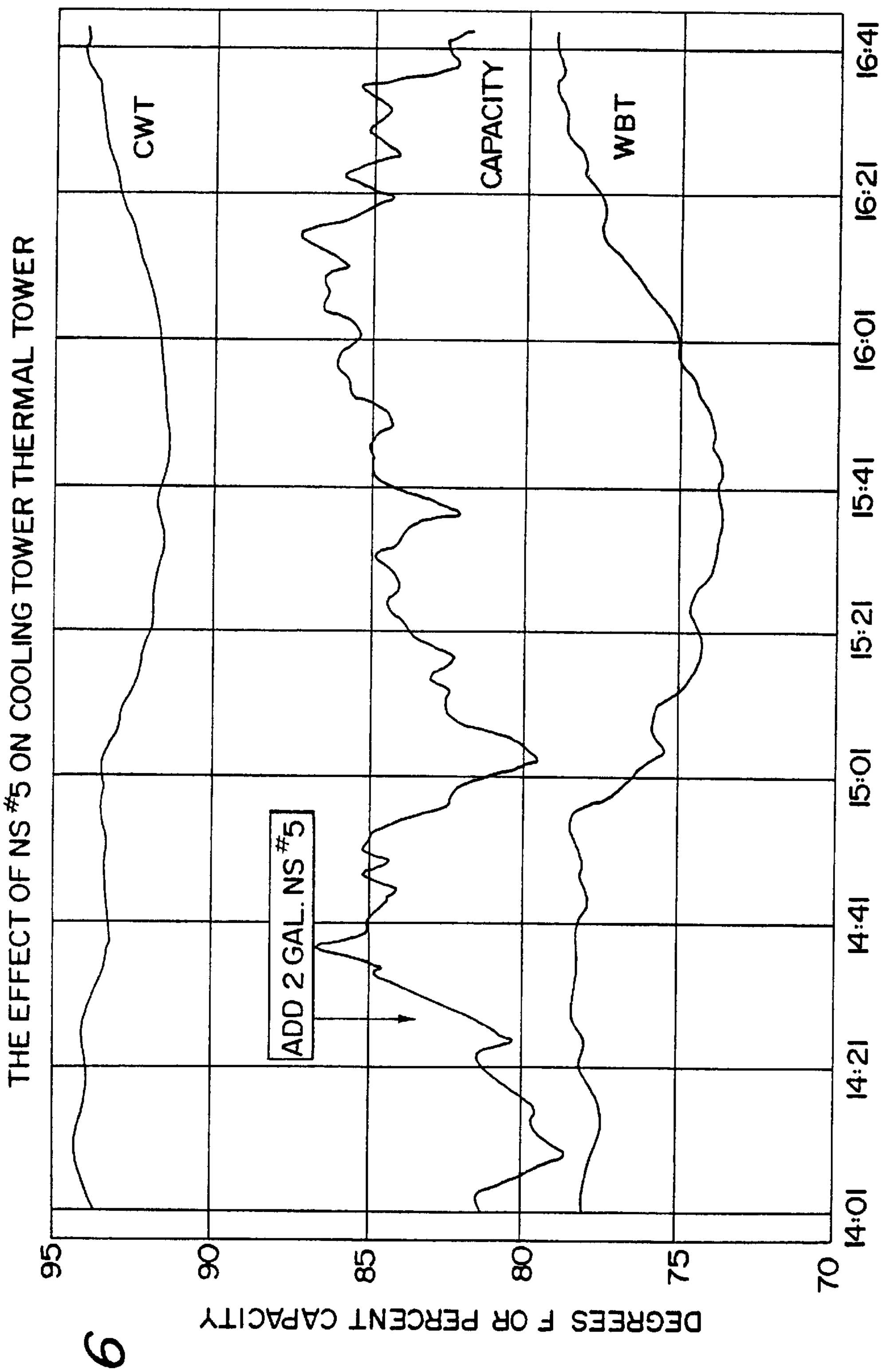

FIG. 2 is a transverse cross section of the splash filled cooling tower showing diffusion decks 4, splash bars 5, air inlet, louvers 6, and perimeter anchorage 7.

FIGS. 3–6 are graphs which plot cooling water (CWT), thermal capacity, and wet bulb temperature (WBT)on the "y" axis against time on the "x" axis. Each graph shows that the thermal capacity of the cooling tower increased when three different nonionic surfactants were added to the cooling tower basin.

DETAILED DESCRIPTION OF THE INVENTION

This process works on any splash filled cooling tower. The air flow in the tower is dependent on the design and operating conditions of the tower. Draft in the cooling tower is typically supplied by mechanical means such as fans or by natural means such as the buoyancy of the air column in a very tall stack. Stack heights of 50 meters to 150 meters are common.

Splash filled cooling towers use splash-type fill as the primary heat transfer surface. Splash-type fill is typically a succession of horizontal bars, "splash bars", which comprise the splash surface of the fill deck in a splash-filled cooling tower. Splash bars are usually flat or shaped to improve structural rigidity and/or heat transfer. Flat bars are sometimes referred to as "slats" or "lath". Although the type of splash bars is not critical to the invention, modern high efficiency splash bars are preferably used.

For a steam-based power generation process, fuel usage is decreased and power production is increased if there are efficiency gains in process heat rejection. Enhanced heat rejection occurs when process cooling water temperatures are reduced. A more efficient cooling tower results in lower cooling water temperatures. The invention enhances the cooling tower thermal performance, allowing for a reduction in cooling water temperature, thereby increasing power generation process efficiency.

Thermal efficiency of the cooling tower is related to an increase in the thermal capacity of the cooling tower. The thermal capability of a cooling tower is the ratio of the adjusted test circulating water rate to the predicted test circulating water rate at the test thermal conditions. This ratio is expressed as a percentage and can be expressed by the following formula:

$$\text{Tower capability (\%)} = \frac{\text{Adjusted test water rate}}{\text{Predicted test water rate}} \times 100$$

Thermal capability is measured by ASME Test Code PTC 23-1986, "Atmospheric Cooling Water Equipment", November 1986, or CTI test code ATC-105, both of which are incorporated herein by reference.

The nonionic surfactant composition used in this process have an average HLB value of 9–12. At least one nonionic surfactant in the nonionic surfactant composition must have a hydrophobic segment and a hydrophilic segment derived from 2 to 15 moles of polyoxyalkylene ether. Preferably, the hydrophobic segment of the nonionic surfactant is derived from an aromatic hydrocarbon, or an aliphatic $C_{10}$–$C_{30}$ compound selected from the group consisting of saturated fatty acids, unsaturated fatty acids, saturated fatty acid alcohols, fatty triglycerides, and unsaturated fatty acid alcohols. The hydrophilic segment of the nonionic surfactant is preferably a polyalkylene ether derived from 2 to 15 mole ethylene oxide, preferably ethoxylated with from 4 to 10 moles of ethylene oxide.

The nonionic surfactant is used in an effective amount. An effective amount of nonionic surfactant is an amount effective to increase the thermal capacity of the tower circulating water as measured by ASME Test Code PTC 23-1986, "Atmospheric Cooling Water Equipment", November 1986. The effective amount of nonionic surfactant needed is site specific and will depend upon the operating conditions of the cooling tower and the presence of other additives in the cooling tower such as defoamers, biocides, dyes, other surfactants, and dispersants in the cooling water. The effect of other additives will have greater effect when the nonionic surfactant used to increase thermal capability is chemically and/or physically interacting with the other additives. Such interaction may reduce the effect of the nonionic surfactant in increasing the thermal capability of the cooling tower.

Generally, an effective amount of nonionic surfactant is a dosage of 1 ppm to 50 ppm every 1 to 5 hours, more typically from 1 ppm to 30 ppm, and, if circumstances are appropriate, most economically from 1 ppm to 10 ppm, where said amounts are based upon the amount of cooling water treated, and where said dosage is in addition to the amount of nonionic surfactant currently used or demanded for known functions of the cooling tower, such as a defoamer for a biocide. In other words, when no biocide or other material is present which creates a surfactant demand, then only 1–50 ppm of surfactant is used. In the presence of a biocide or other material which creates a surfactant demand, then 1–50 ppm in excess of an effective defoaming amount or an effective amount above said existing surfactant demand is used. This amount is readily apparent to one skilled in the art. If the circumstances are appropriate, preferably the dosage is from 2 ppm to 6 ppm every 1 to 5 hours, most preferably from 2 ppm to 5 ppm every 2 to 5 hours, said ppm being based upon the amount of cooling water treated.

Generally, the higher the dosage of nonionic surfactant fed to the cooling tower to increase thermal capability, the less frequently the nonionic surfactant needs to be fed. Conversely, if the nonionic surfactant is fed more frequently, the dosage of the nonionic surfactant can be reduced. Continuous monitoring of the thermal capability of the cooling tower with respect to the amount of nonionic surfactant fed is preferred to determine what adjustments in dosage and frequency must be made. An initial positive response of the cooling tower from the nonionic surfactant is generally quick, between 30–35 minutes and lasts for several hours.

In order to determine how much nonionic surfactant is needed to obtain an increase thermal capacity, it is suggested that gradual incremental amounts be added to the cooling tower. For instance, one can start by adding 1 ppm of nonionic surfactant to the cooling tower and monitoring for the next 1–2 hour period to determine if an increase in thermal capability is measured. If this amount is insufficient, then 2 ppm should be added and monitored for a one to two hour period. If 2 ppm is insufficient, then 3 ppm should be added and monitored for a one to two hour period. This procedure should be continued until an increase in thermal capability is observed or until it no longer makes economic sense to use a nonionic surfactant to increase thermal capability.

The nonionic surfactant is added undiluted or as an aqueous dispersion to any reservoir in the cooling tower such as the sump or basin. It is convenient to add the nonionic surfactant to the basin near the pump section of the cooling tower.

The following definitions and abbreviations are used in the examples and description of the invention.

DEFINITION AND ABBREVIATIONS cwt=cold water temperature.

DECYL HEAVIES=A complex mixture of alcohols, ethers, esters and other organic compounds sold by BASF Corporation under the product name "Heavy Oxo Ends" and the product number EP-290. The primary components of interest are $C_{12}$–$C_{20}$ (32–38 weight percent) alcohols and $C_{21}$ and higher alcohols (10–12 weight percent).

HLB=Hydrophile/lipophile balance. This is the measurement of water soluble (hydrophilic) to oil soluble (lypophilic or hydrophobic) segment of a surfactant. For most esters this can be calculated by the equation HLB=20 (1−S/A) where S is the saponification value of the ester and A=acid value of recovered acid from ester.

NS #1=100% polyethylene glycol 600 dioleate having an HLB of 10.0.

NS #2=A nonionic surfactant solution comprising decyl heavies (88.48 weight percent), 15 mole ethoxylate of castor oil having an HLB of 9.6 (2.3 weight percent), 4 mole ethoxylate of lauryl alcohol (9.22 weight percent) having an HLB of 9.0.

NS #3=A nonionic surfactant solution having an HLB of 9.3 comprising decyl heavies (76.1 weight percent), aluminum stearate (3.7 weight percent), hydrophobic silica (10.2), 15 mole ethoxylate of castor oil (2.0 weight percent), 4 mole ethoxylate of lauryl alcohol (8.0 weight percent).

NS #4=A nonionic surfactant solution having an HLB of 9.4 comprising 2-ethyl hexanol bottoms which result from the distillation of 2-ethyl hexanol by the "oxo process" (88.5 weight percent), 15 mole ethoxylate of castor oil (2.30 weight percent), 4 mole ethoxylate of lauryl alcohol (9.2 weight percent).

NS #5=A nonionic surfactant solution having an HLB of 9.2 comprising 2-ethyl hexanol bottoms (79.8 weight percent), 15 mole ethoxylate of castor oil (2.1 weight percent), 4 mole ethoxylate of lauryl alcohol (8.3 weight percent), and hydrophobic silica (9.86 weight percent).

SPLASH FILLED COOLING TOWER=A cooling tower, such as that shown in FIG. 1, which contains splash bars against which the incoming water splashes while being cooled.

Wet bulb temperature (wbt)=The ambient air temperature of the cooling tower as indicated by a psychrometer. Also known a the thermodynamic wet-bulb temperature of the temperature of adiabatic saturation. Wet bulb temperature is measured in °F.

EXAMPLES

The cooling tower used in the examples was a Marley Tower Model 663-0-04 double flow, induced draft, cross flow, four cell splash filled cooling tower erected in a concrete basin. The hot water to the cooling tower came from process heat exchangers in a methanol plant having a flow rate of a 50,000 gallons per minute and a temperature of about 48° C. The nonionic surfactant was added to the water in the concrete basin near the pump section of the cooling tower as a bulk dose in an amount of about 2.5 ppm based upon the water treated.

All process water temperatures and ambient wet bulb temperatures were measured with platinum resistance thermometers (RTDs) connected to a Fluke data acquisition system. Scanned data were recorded on portable computer. All RTDs were calibrated ±0.05° F. against on NIST traceable standard.

CONTROL A

This experiment did not use a nonionic surfactant. The cooling tower operated as previously described. The effluent water temperature, inlet water temperature, and ambient conditions were measured at one minute intervals. Temperatures of the effluent water under normal operating conditions ranged from 32° C. to 35° C.

EXAMPLES 1–5

In Examples 1–5, the operating procedure of Control A was followed except various nonionic surfactants were added in the amount of 2.5 ppm, based upon the amount of water treated, to the basin of the cooling tower. The nonionic surfactants used are set forth in Table I which follows.

The data in Table I indicate that the cooling tower thermal capability increased and the effluent temperature of the cooling tower dropped when the nonionic surfactants within the scope of this invention were added. This indicates that the cooling tower was operating more efficiently after the nonionic surfactant was added to the cooling tower water, i.e. the water in the tower system was cooled to a lower temperature after the non ionic surfactant was added.

TABLE I

EFFECT OF NONIONIC SURFACTANT ON SYSTEM THERMAL CAPABILITY AND TEMPERATURE OF EFFLUENT WATER

| EXAMPLE | NON IONIC | SYSTEM THERMAL CAPABILITY (%) BEFORE | AFTER | TEMP. DIFFERENCE |
|---|---|---|---|---|
| CONTROL A | none | NA | NA | 0 |
| 1 | NS #1 | 84.7 | 88.3 | −0.60 |
| 2 | NS #2 | 83.7 | 89.4 | −0.97 |
| 3 | NS #3 | 86.4 | 90.7 | −0.65 |
| 4 | NS #4 | 83.1 | 84.9 | −0.30 |
| 5 | NS #5 | 80.3 | 84.4 | −0.75 |

FIGS. 3–6 show a graphical picture of the effect of adding nonionic surfactants NS# 1, NS# 2, NS# 3, and NS # 5 to the cooling tower over a specified time. As these graphs show, a clear increase of the thermal capability of the cooling tower was observed shortly after each of the four nonionic surfactants were introduced. Depending upon the nonionic surfactant and the weather conditions, an increase in thermal capability was sustained for up to seven hours.

EXAMPLE 6

Further tests were conducted in the methanol plant described in the previous examples, but the efficiency in plant production was also considered in view of the subject process. Tests were conducted during the peak cooling season. The weather was sunny and the wind speed was less than 10 miles per hour. The ambient dry bulb temperature for the trail days averaged about 97° F.

On day one, the cooling tower was dosed with NS #1 at approximately 3:00 pm at a concentration of 5 ppm. The cold water temperature dropped continuously for the 35 minute period immediately after addition of the product for a total drop of about 1.1° F. The significant temperature drop was sustained for 2 to 3 hours with a return to pre-trial baseline temperature after 4–5 hours despite rising wet bulb temperatures.

The cooling tower thermal capability was improved by 6.53% with the use of NS #1. The approach temperature (cwt-wbt) was reduced from 20.9° F. to 19.5° F. The efficiency improvement in heat removed from the tower was approximately 417,000 Btu/min. The plant's monitoring equipment measured a decrease of 1° C. in the effluent cooling water from 45° C. to 44° C.

On day two, the cooling tower was dosed with NS #2 at approximately 2:00 pm at a concentration of 5 ppm. The cold water temperature dropped a total of about 1.3° F. The effect was sustained for approximately 2 hours with a return to pre-trial baseline temperature after 4–5.

The cooling tower thermal capability was improved by 7.2% with the use of NS #2. The approach temperature was reduced from 19.9° F. to 18.5° F. The efficiency improvement in heat removed from the tower was approximately 542,000 Btu/min. The plant's monitoring equipment measured a decrease of 1° C. in the effluent cooling water from 45° C. to 44° C., as well as a 1° C. decrease in process water from 33° C. to 32° C.

The data indicate that the subject process also improves plant productivity. For this particular plant, a 1° F. decrease in cold water temperature correlates into a 1% increase in methanol production.

We claim:

1. A process for increasing the system thermal capability of a cooling tower comprising:

contacting the circulating water of the cooling tower with a nonionic surfactant composition in an amount effective to increase the system thermal capability of said cooling tower, said nonionic surfactant composition comprising at least one nonionic surfactant having the following characteristics:

(a) a hydrophobic segment; and (b) a hydrophilic segment;

such that the average HLB of the nonionic surfactant composition is from 9–12; monitoring the thermal capability of said cooling tower; and adjusting feeding of said nonionic surfactant when needed based upon the said monitoring.

2. The process of claim 1 wherein the hydrophobic segment of the nonionic surfactant is derived from an aromatic hydrocarbon, or an aliphatic $C_{10}$–$C_{30}$ compound selected from the group consisting of saturated fatty acids, unsaturated fatty acids, saturated fatty acid alcohols, fatty triglycerides, and unsaturated fatty acid alcohols.

3. The process of claim 1 wherein the hydrophobic segment of the nonionic surfactant is derived from an aliphatic $C_{10}$–$C_{30}$ fatty acid alcohol.

4. The process of claim 3 wherein the hydrophilic segment of the nonionic surfactant is a polyalkylene ether having from 2 to 15 moles of ethylene oxide.

5. The process of claim 4 wherein the feedpoint of the nonionic surfactant is the collection basin of the cooling tower.

6. The process of claim 5 wherein the dosage of nonionic surfactant is 1.0 ppm to 50.0 ppm every 1 hour to 5 hours based upon the amount of water cooled.

7. The process of claim 6 wherein the dosage of nonionic surfactant is 1.0 ppm to 30.0 ppm every 1 hour to 5 hours based upon the amount of water cooled.

8. The process of claim 7 wherein the cooling tower is a splash filled cooling tower.

9. The process of claim 8 wherein the splash filled cooling tower is a mechanical or natural draft-type, evaporative cooling tower.

10. The process of claim 9 wherein the dosage of nonionic surfactant is 2.0 ppm to 6.0 ppm every 2 hours to 5 hours based upon the amount of water cooled.

11. The process of claim 1 wherein the cooling tower is a splash filled cooling tower.

12. The process of claim 11 wherein the splash filled cooling tower is a mechanical or natural draft-type, evaporative cooling tower.

13. The process of claim 1 wherein said composition consists essentially of said nonionic surfactant.

14. The process of claim 1 wherein said monitoring is continuous.

15. The process of claim 1 wherein said contacting results in an initial positive response of the said thermal capability within 30–35 minutes of said contacting.

16. The process of claim 1 wherein the cooling tower is a splash filled cooling tower; said composition consists essentially of said nonionic surfactant; and said monitoring is continuous.

17. The process of claim 16 wherein said contacting results in an initial positive response of the said thermal capability within 30–35 minutes of said contacting.

18. The process of claim 16 wherein the dosage of nonionic surfactant is 1.0 ppm to 50.0 ppm every 1 hour to 5 hours based upon the amount of water cooled.

19. The process of claim 18 wherein the dosage of nonionic surfactant is 1.0 ppm to 30.0 ppm every 1 hour to 5 hours based upon the amount of water cooled.

20., The process of claim 19 wherein the dosage of nonionic surfactant is 2.0 ppm to 6.0 ppm every 2 hours to 5 hours based upon the amount of water cooled.

* * * * *